Oct. 11, 1960

E. G. GARDINER 2,955,350

BEARING FOR A ROTARY SHAFT

Filed Aug. 8, 1958

INVENTOR.
EMMETT G. GARDINER
BY
HIS ATTORNEY

United States Patent Office 2,955,350
Patented Oct. 11, 1960

2,955,350
BEARING FOR A ROTARY SHAFT
Emmett G. Gardiner, Louisville, Ky., assignor to General Electric Company, a corporation of New York Filed Aug. 8, 1958, Ser. No. 753,982
3 Claims. (Cl. 29—149.5)

The present invention relates to a bearing for a rotary shaft and more particularly to a bearing member having an arrangement therein for aligning the bearing with respect to the shaft, and to a method of aligning or setting a bearing with respect to the load on a shaft.

Although it will be understood that the invention is broadly applicable generally to bearings designed to support a rotary shaft, it is particularly useful in connection with refrigerant compressors having a shaft arranged to drive components for compressing a refrigerant gas, which shaft is normally subjected to unbalanced load conditions during the compression of the gases; and for the purposes of illustration, the invention will be shown and described in connection with such a refrigerant compressor of the rotary type.

One form of refrigerant compressor of this type includes a compressor unit and its driving motor mounted one above the other within a hermetic casing. The motor drive shaft is held in the vertical position by a main frame member which is supported by the casing. The compressor housing, or cylinder containing the compression chamber is secured to the main frame with the shaft extending through the bearings of the main frame into the compression chamber. The shaft has its end portion journaled into a bearing member formed in the lower end wall of the compression chamber. The lower end wall or lower bearing containing member is normally separate from the compression cylinder and must be assembled onto the cylinder after the cylinder is attached to the main frame. The problem arises in aligning the lower bearing with respect to the upper bearings carried in the main frame when the lower end wall is assembled onto the compression cylinder. Since the compressive forces set up by the gas within the compression chamber vary throughout the rotational cycle of the compressor, it is desirable to have the upper and lower bearings aligned such that they provide maximum bearing support during that portion of the compression stroke when the gas pressure exerts the greatest force against the shaft.

Accordingly, it is an object of the present invention to provide an improved bearing for supporting a rotary shaft which bearing has designed as an integral part thereof means for effecting alignment of the bearing with respect to the surface of the shaft.

Another object of the present invention is to provide an improved bearing which can easily be aligned with respect to the surface of the shaft so that the bearing provides support for the shaft at that point during the rotation of the shaft when the shaft encounters its greatest load conditions.

A further object of the present invention is to provide an improved method for adjusting the alignment of a plurality of bearings with respect to the surface of a shaft.

A more specific object of the present invention is to provide a method for aligning a bearing member with respect to a rotatable shaft by calibrating, at different points around the inner periphery of the bearing, the space between the bearing and the surface of the shaft.

Further objects and advantages will become apparent as the following description proceeds and the features of novelty which characterize the invention will be pointed out with particularity in the claims annexed to and forming a part of this specification.

In carrying out the objects of the invention there is provided a bearing member having an inner annular bearing surface around which there are arranged at spaced intervals a plurality of fluid leakage nozzles. Means are provided for connecting each of the leakage nozzles with a source of fluid under pressure which source is adapted for connection to flow guages. The leakage of fluid from each nozzle into the space between the bearing surface and the surface of the shaft is directly proportional to the distance between these surfaces. By adjusting the bearing according to the flow of fluid into this space, as indicated on the flow guages, the bearing is aligned in any desired position.

As a further aspect of the present invention there is provided a method for aligning the bearing with respect to the shaft which comprises providing a bearing member having a plurality of fluid leakage nozzles spaced at intervals around the bearing surface with each of the nozzles having a fluid supply passage connecting through a flow guage with a source of fluid under pressure, placing the bearing into its approximate position on the shaft and adjusting the position of the bearing with respect to the shaft according to calibration of the fluid flow through the passages by the flow guages.

For a better understanding of the invention, reference may be had to the accompanying drawing in which.

Figure 1:
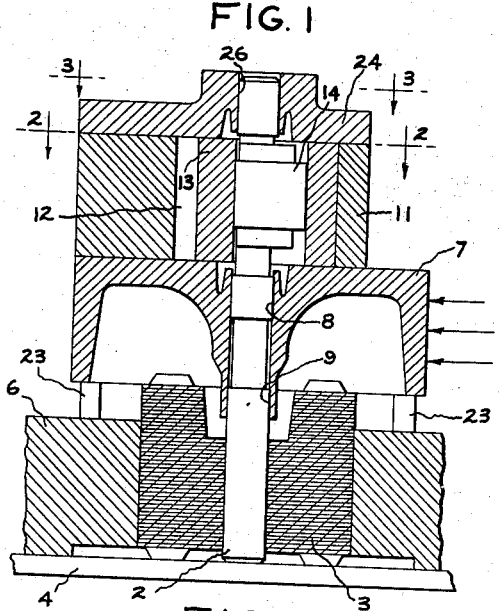
Fig. 1 is a cross-sectional elevational view showing the components of a compressor in their vertical position on the motor drive shaft.
Figure 3:
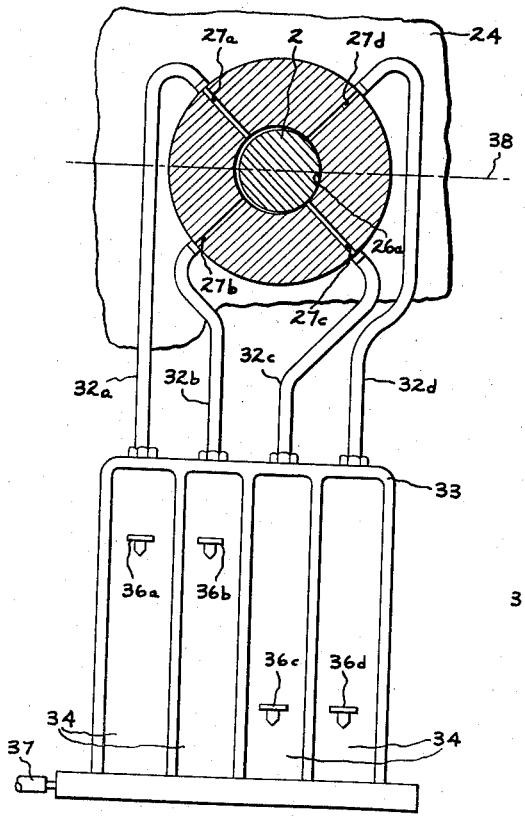
Figure 4:
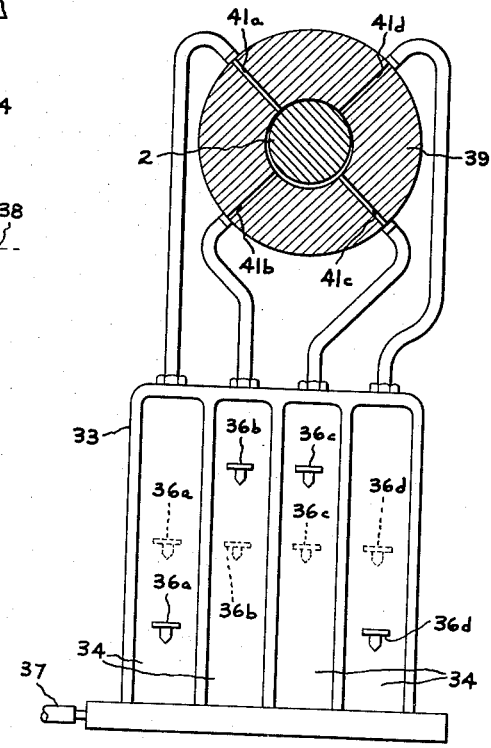

Fig. 3 is a plan view, in exaggerated perspective, taken along line 3—3 of Fig. 1 illustrating the fluid leakage nozzles connected to sources of fluid passing through a fluid flow indicator; and Fig. 4 is a large cross-sectional view showing, in greatly exaggerated perspective, a shaft arranged within a bearing member and illustrating the centering of shaft surface with respect to the surface of the bearing through the adjustment of the position of the bearing member.

Figure 2:
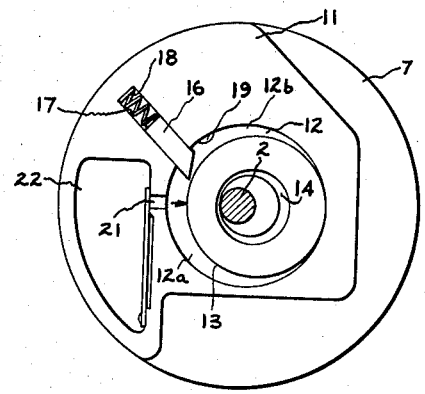
Fig. 2 is a plan view taken along line 2—2 of Fig. 1 showing the compression chamber of the compressor.

Referring now to Fig. 1, there are shown the components of a rotary refrigerant compressor disposed in vertical relationship with respect to the motor drive shaft 2. These components are arranged in the order of their assembly and are actually disposed in reverse or 180° from the position they assume when placed within the hermetic casing. As seen in Fig. 1, the drive shaft 2, which is press fitted into the motor rotor 3, extends vertically upward. The rotor 3 and shaft are supported in the vertical direction upon the surface of a supporting member 4. The rotor is rigidly held in position by means of a clamp or vice 6 which holds the rotor firmly between the two clamping portions of the vice. Arranged above the rotor is the main frame 7 containing, in the illustrated embodiment of the invention, a pair of bearing surfaces 8 and 9 which, when the entire assembly is placed within the hermetic casing, support the shaft for rotation about its axis. Directly above the main frame, in the assembly illustrated in Fig. 1, there is provided a compressor cylinder or housing 11 containing the compression chamber 12 in which the refrigerant gases are compressed. In order to compress the gases within the chamber 12 there is provided a compressor rotor 13 which sweeps the outer periphery of the chamber 12 during rotation of the shaft 2. An eccentric portion 14 on the shaft drives the compressor rotor 13. As may best be seen in Fig. 2, the compression chamber 12 is divided into high and low pressure sides 12a and 12b respectively by means of a blade 16 which is biased into engagement with the outer periphery of the rotor 13. The blade 16 reciprocates back and forth within a slot 17 formed in the housing 11 and follows the eccentric motion of the rotor 13 as its outer periphery sweeps the inner annular surface of the compression chamber 12. In the present modification, the blade 16 is biased into contact with the motor 13 by means of a spring 18, which is inserted behind the blade in the slot 17.

Gas is drawn into the compression chamber 12 during each cycle through the inlet port 19 and is discharged from the compression chamber through the discharge port 21 into the high pressure discharge chamber 22, formed as an integral part of the cylinder or housing 11. During assembly, the cylinder 11 with its compression chamber 12 therein is precisely located with respect to the position of the rotor 13 and the cylinder is then securely bolted, or attached by other means such as welding or brazing, to the main frame 7. As may be seen in Fig. 1, the main frame 7 actually forms one end wall of the chamber. To facilitate the assembly of these members they are arranged in the position shown in Fig. 1 with the main frame 7 and the cylinder assembly resting upon a plurality of supporting members 23 which support the assembly in its vertical position with respect to the shaft 2.

Forming the other end wall of the compression chamber and arranged in the uppermost position with respect to the shaft in Fig. 1 is a bearing plate 24 which is designated the lower bearing plate because of its position during operation of the compressor within the hermetic casing, which position is exactly reversed from that shown in Fig. 1. During assembly of the bearing plate 24 it is necessary to consider the unbalanced loads on the bearings supporting the shaft during compression of the gas by the rotor 13. The unbalanced load which is placed on these bearings during rotation of the shaft may best be understood by reference to Fig. 2. During the rotation of the shaft 2 and during the compression cycle, the gases are compressed in the high pressure side 12a of the compression chamber and produce a gradually increasing pressure within this side 12a of the chamber. This pressure results in a component of force on the rotor which is transmitted to the eccentric and the shaft 2. This component of force is at its maximum value for the greatest length of time during each cycle in the approximate direction shown by the arrow in Fig. 2. That is, the force exerted by the gas pressure in the chamber is directed against the rotor 13 for the greatest length of time in the direction generally indicated by the arrow in Fig. 2 which is shown in the area opposite the discharge port 21. In order to compensate for the force of these compressed gases, it is necessary to align all of the bearings so that they will provide a solid bearing support opposing the force on the shaft or, more specifically, opposing the pressure of the gas on the rotor 13 which is transmitted to the shaft by the rotor during the time when the force is at a maximum. That is, it is necessary to have the bearings lined up to provide a solid support in a direction opposing the force indicated by the arrow in Fig. 2.

During assembly, operating conditions are simulated by applying a force against the main frame in a direction generally shown by the arrows in Fig. 1. This force is diametrically opposed to the force which would result from the high pressure gas within the cylinder and actually places the lower bearings in the position with respect to the shaft that they would assume if there were a highly compressed gas in the compression chamber. There is always some "play" or space between the shaft surface and bearing surface and the force on the main frame causes the right side of the bearings 8 and 9, as seen in Fig. 1, to move flush against the shaft. After the main frame bearings are in this position it is necessary to align the bearing surface 26 so that it will present its corresponding side to the shaft.

It is not desirable to align the bearing surface 26 by exerting a force against the external surface of the bearing plate 24, as is done to adjust the position of the bearings 8 and 9 carried by the main frame, because the moment of force thereby created causes the other components to move out of position. Thus, in order to align the upper bearing surface 26, there are provided within the bearing surface 26 a plurality of fluid leakage nozzles spaced at intervals around the bearing surface. More specifically, as can be seen in Fig. 3, there are provided the fluid leakage nozzles 27a, 27b, 27c, 27d. In the illustrated embodiment of the invention those nozzles are arranged at equal intervals around the surface of the bearing with the nozzle 27a diametrically opposed to the nozzle 27c and the nozzle 27b diametrically opposed to the nozzle 27d. As can be seen in Fig. 3, each of the fluid leakage nozzles is connected to a fluid supply passage or conduit generally designated by the numeral 32 and specifically designated as conduits 32a, 32b, 32c, and 32d leading respectively to the nozzles 27a, 27b, 27c and 27d. All of the conduits lead to a measuring instrument or flow guage 33.

While the measuring instrument may take on a wide variety of different forms and may be operated in response to changes in fluid flow or by pressure measurements, it is preferred that the instrument include a plurality of indicators responsive to the rate of flow of a fluid, such as air under pressure, through the various conduits 32a, 32b, 32c, and 32d. These instruments are well-known on the market and need not be discussed in detail in the specification except insofar as to say that they measure the rate of flow of fluid through the passages and indicate this rate of flow by means of indicators which may be seen within the transparent tubes 34. Thus each of the indicators 36a, 36b, 36c and 36d measures the rate of fluid flow through the respective passages 32a, 32b, 32c and 32d. Fluid is supplied to the measuring instrument 33 through a tube 37 from a suitable source of supply and is supplied to the passages 32a, 32b, 32c, and 32d through the measuring instrument.

After the lower bearing plate 24 is placed over the shaft and has been approximately oriented with respect to the components of the cylinder 11, the fluid, or air pressure, is applied through the measuring instrument 33. Fluid flows through the passages 32a, 32b, 32c and 32d respectively into the nozzles 27a, 27b, 27c and 27d and thereupon escapes through these fluid leakage nozzles into the space between the surface of the shaft 2 and the surface of the bearing 26. This space is greatly exaggerated in Fig. 3 for the purpose of illustrating the manner in which the bearing is properly aligned. The fluid supplied through the nozzle flows freely to the atmosphere through the space between the shaft and the bearing surface. The distance between the shaft and the bearing surface determines the rate of flow of fluid through the leakage nozzles and this flow is indicated or calibrated by the indicators 36a, 36b, 36c and 36d. As stated previously the fluid leakage nozzles are spaced at intervals around the inner annular surface of the bearing so that, if the shaft is not exactly centered with respect to the bearing, the amount of fluid leakage through the various nozzles is not equal. In other words, the unbalanced spacing between the shaft surface and the bearing surface gives unbalanced readings on the guaging instrument 33.

For locating the upper bearing surface 26 with its right hand edge, as seen in Figs. 1 and 3, flush with the shaft surface and thereby in alignment with the right hand portions of the bearings 8 and 9, the bearing is then moved so that the space between the surface of the shaft and the bearing at the fluid leakage nozzles 27a and 27b is greater than the space between the surface of the shaft and the bearing surface adjacent fluid leakage nozzles 27c and 27d. The side 26a of the bearing surface 26 is moved so that it touches the shaft and in order to assure that the shaft is centered in the space between the nozzles 27c and 27d it is necessary that the flow of fluid into the spaces adjacent these nozzles be equal and also that the flow of fluid into the space adjacent the nozzles 27a and 27b be equal. This is the case as indicated in Fig. 3. When the side 26a of the bearing surface 26 is moved flush with the surface of the shaft 2 and when the guaging instrument 33 indicates equal flow through nozzles 27c and 27d and equal flow through nozzles 27a and 27b, then the bearing plate 24 is securely attached to the cylinder housing 11. This is the case in Fig. 3 wherein the indicators 36a and 36b are level indicating the same amount of fluid flow through the leakage nozzles 27a and 27b and the indicators 36c and 36d are level indicating the same amount of fluid flow through the fluid leakage nozzles 27c and 27d.

Although the bearing plate 24 can be manually moved into position flush against the shaft 2, it is contemplated that this movement be performed by utilizing the fluid flow from the nozzles. By applying a greater fluid pressure to nozzles 27a and 27b than is applied to the nozzles 27c and 27d, the bearing is forced away from the shaft in the area adjacent nozzles 27a and 27b. It has been determined in actual practice that an air pressure approximately 75 p.s.i. through the passages 32a and 32b when applied through leakage nozzles 27a and 27b of 3/32 inch in diameter cause a bearing plate 24 weighing approximately one pound to shift into position with the opposite side 26a of the bearing flush against the surface of the shaft. In the above mentioned assembly, the air pressure in the passages 32c and 32d was 5 p.s.i. Using the above air pressure also caused the bearing surface 26 to seek an equilibrium position so that the flow of air through the nozzles 27a and 27b as well as the flow through nozzles 27c and 27d adjusted the position of the bearing almost automatically. In some instances further minor adjustment must be made to create equal flow through the respective nozzles. This is done by gently tapping the bearing plate 24. Thus, by using two pairs of fluid leakage nozzles with one pair 27a and 27b arranged on one half of the bearing and the other pair 27c and 27d disposed on the opposite half of the bearing, the bearing can be moved in a particular direction by applying a greater fluid pressure through one pair of leakage nozzles than through the other pair. Also, the nozzles of each pair of nozzles are arranged equidistant on opposite sides of a plane passing through the desired line of contact with the shaft and the center of the shaft, such as the plane indicated by the line 38 of Fig. 3, the bearing then automatically adjusts its position and centers itself with respect to this plane. Therefore, as a further aspect of the present invention not only is it possible to align the bearing by the indications sensed in the measuring instrument 33 but the actual positioning of the bearing is performed by applying fluid under different pressures through the nozzles or opposite halves of the bearing.

The advantage of using air pressure to move the bearing into position is that no external force need be applied to the bearing plate so that the only force applied against the shaft is the force of the air pressure on the bearing itself. This does not create a moment of force to deflect the shaft away from the remaining components which have already been aligned therewith, which would be the case if an external force had to be used.

It is not always necessary to align the bearing with respect to a particular part of the shaft surface. Sometimes it is expedient to adjust the bearing so that the bearing surface is equidistant from the shaft. Referring to Fig. 4 there is shown, in somewhat exaggerated form, a shaft 2 and bearing 39 completely out of alignment. With the same air pressure applied through all of the leakage nozzles 41a, 41b, 41c and 41d, the measuring instrument 33 calibrates the flow of air through the passages. As shown in Fig. 4, with the shaft 2 closely adjacent the surface of the bearing between the nozzles 41a and 41d, the indicators on the measuring instruments 33 are arranged as shown in the solid lines. After adjusting the bearing with respect to the shaft 2 so that the leakage from the nozzles is the same around the entire surface of the bearing, then the measuring instrument 33 calibrates the air flow as indicated in dotted lines in Fig. 4. When the indicators 41a, 41b, 41c and 41d are in alignment across the measuring instrument, then the bearing surface is equidistant from the shaft at all points around the periphery of the shaft. By this method, the position of the bearing surface with respect to the shaft can be quickly adjusted so that the shaft surface is centered in the bearing.

By the present invention there is provided a bearing having integrally formed therewith a means for precisely aligning the bearing in any particular position with respect to the surface of the shaft. Furthermore, by the method of the present invention the bearing can be aligned with respect to the surface of the shaft without exerting any external force against the bearing member.

While in accordance with the patent statutes there has been described what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. A method for aligning a bearing with respect to a rotary shaft having an unbalanced load thereon comprising providing a bearing member with a bearing surface having a pair of low pressure fluid leakage nozzles arranged less than 180° apart on one side of said bearing surface and a pair of high pressure fluid leakage nozzles arranged less than 180° apart on the opposite side of said bearing surface, placing said bearing in its approximate position on said shaft, connecting each of said low pressure fluid leakage nozzles through a fluid guage with a source of low pressure fluid connecting each of said high pressure fluid nozzles through a fluid guage with a source of high pressure fluid so that said high pressure fluid leakage nozzles force said bearing away from said shaft surface adjacent said high pressure nozzles, making minor adjustment in the position of said bearing to equalize the rate of fluid flow through said high pressure leakage nozzles and to equalize the rate of fluid flow through said low pressure leakage nozzles according to the calibration of fluid flow shown on said fluid guages and affixing said bearing in said adjusted position with respect to said shaft.

2. A method of aligning a bearing with respect to a rotary shaft comprising providing a bearing member having a plurality of fluid leakage nozzles spaced at intervals around the bearing surface, placing said bearing in its approximate position on said shaft, passing fluid under pressure through said fluid leakage nozzles while measuring the flow through each nozzle, adjusting the position of said bearing with respect to said shaft according to the amount of fluid flowing through said respective fluid leakage nozzles and affixing said bearing in said adjusted position with respect to said shaft.

3. A method of aligning a bearing with respect to a rotary shaft comprising providing a bearing member having a plurality of fluid leakage nozzles spaced at intervals around the bearing surface, placing said bearing in its approximate position on said shaft, connecting a fluid supply line to each of said nozzles, measuring the flow of fluid through each of said supply lines, adjusting the position of said bearing with respect to said shaft according to the rate of fluid flowing into the space between said shaft and said bearing surface through said leakage nozzles as measured in said fluid supply lines and affixing said bearing in said adjusted position with respect to said shaft.

References Cited in the file of this patent
UNITED STATES PATENTS 2,663,977    Gerard et al.  ---------- Dec. 29, 1953
2,683,983    Aller  ------------------ July 20, 1954